(No Model.)

J. STORCK.
GAME PIECE AND METHOD OF EXHIBITING THE SAME.

No. 258,821. Patented May 30, 1882.

WITNESSES
Joseph Ishbaugh.
B. W. Williams

INVENTOR
Joseph Storck
by his atty.,
Henry W. Williams

UNITED STATES PATENT OFFICE.

JOSEPH STORCK, OF BOSTON, MASSACHUSETTS.

GAME-PIECE AND METHOD OF EXHIBITING THE SAME.

SPECIFICATION forming part of Letters Patent No. 258,821, dated May 30, 1882.

Application filed September 1, 1881. (No model.)

*To all whom it may concern:*

Be it known that I, JOSEPH STORCK, a citizen of the Republic of France, residing in Boston, in the county of Suffolk and State of Massachusetts, have invented a new and useful Improvement in Game-Pieces and Methods of Exhibiting the Same, of which the following is a specification.

This improvement relates to framed stuffed animals, birds, and fishes so preserved that the living shape is retained in all its fullness; and the invention consists in a bird, fish, or animal stuffed or otherwise preserved so as to retain the natural form, and placed in a frame having the usual style of back, but provided with a convexo-concave or bulging glass projecting far enough beyond the front of the frame to allow the preserved animal to lie against the back of the frame without being touched by the glass, and hence without suffering any injury to its shape by being pressed or flattened.

Figure 1:
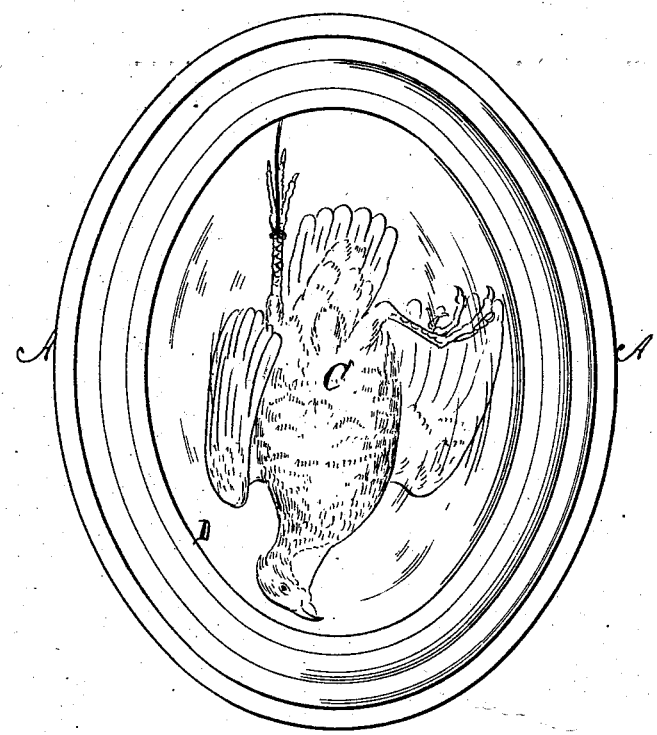
Figure 2:
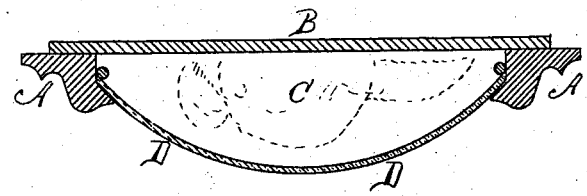

In the accompanying drawings, in which similar letters of reference indicate like parts, Figure 1 is an elevation of my invention. Fig. 2 is a transverse horizontal section of the same.

A is a frame, preferably oval in shape. B is the back of the frame, constructed in the ordinary manner. C represents a stuffed bird secured at various points to the back B of the frame by means of wires and cement. D is the glass, convexo-concave or bulging outwardly, as seen in Fig. 2, beyond the bird C, thus allowing it to retain its life-like shape without danger of being pressed or jammed, as would necessarily be the case if a flat glass were employed. The whole makes a very beautiful wall-ornament, much superior to any picture or representation of game, as the game itself in its natural shape is thus preserved and hung up, safely protected by the glass and frame. The appearance of the game through the glass when of the shape shown is very pleasing, the shape of the glass seemingly enhancing the "standing-out" qualities of the inclosed game.

I am aware of the existence of frames having convexo-concave protecting-glasses providing recesses for the reception of flowers, shells, and other articles of ornament; and I am aware that stuffed and preserved birds, fish, &c., in cases for exhibition, are often found in museums, in which said birds, &c., are represented as if in life. I do not claim that it is novel to construct frames or cases for hanging up and containing specimens of insects held in place by securing-pins; and I am also aware that representations of framed game-pieces, where the game is represented by being struck up in relief from the back and painted in imitation of the desired specimen, are common in the market.

Having thus fully described my invention, what I claim, and desire to secure by Letters Patent, is—

1. The improved method hereinbefore described of exhibiting representative samples of game, for use especially in restaurants, dining-rooms, and the like, which consists in firmly attaching at various points by means of wires and cement a stuffed and preserved natural specimen of the bird, fish, or other specimen of game to be exhibited to a flat backing of suitable material, and then inclosing the same in an oval or other shaped frame of the character of the ordinary picture-frame, adapted to be suspended, and provided with a transparent glass plate in front of sufficient convexity to inclose the specimens and preserve the same from injury, substantially as set forth.

2. As a new article of manufacture, a framed game-piece composed of a stuffed and preserved bird firmly attached at various points by means of wires and cement to a backing of wood or other suitable material, and an inclosing frame provided with the convexo-concave glass plate D, adapted to conform to the contour and relief of the inclosed game specimen without injury to its form, substantially as described and shown.

JOSEPH STORCK.

Witnesses:
HENRY W. WILLIAMS,
A. RATISSEAU.